US012591790B2

(12) United States Patent

Schoenharl et al.

(10) Patent No.: US 12,591,790 B2

(45) Date of Patent: Mar. 31, 2026

(54) SYSTEMS AND METHODS FOR PROCESSING DATA FOR STORING IN A FEATURE STORE AND FOR USE IN MACHINE LEARNING

(71) Applicant: Coupang Corp., Seoul (KR)

(72) Inventors: Timothy Schoenharl, Shanghai (CN); Chaoshu Sha, Shanghai (CN); Shanshan Chen, Shanghai (CN); Miao Wang, Shanghai (CN)

(73) Assignee: Coupang Corp., Seoul (KR)

( * ) Notice: Subject to any disclaimer, the term of this patent is extended or adjusted under 35 U.S.C. 154(b) by 1149 days.

(21) Appl. No.: 17/643,087

(22) Filed: Dec. 7, 2021

(65) Prior Publication Data

US 2022/0188660 A1 Jun. 16, 2022

Related U.S. Application Data

(60) Provisional application No. 63/123,925, filed on Dec. 10, 2020.

(51) Int. Cl.
| | |
|---|---|
| *G06N 5/022* | (2023.01) |
| *G06F 16/215* | (2019.01) |
| *G06F 16/25* | (2019.01) |

(52) U.S. Cl.
CPC ........... *G06N 5/022* (2013.01); *G06F 16/215* (2019.01); *G06F 16/25* (2019.01)

(58) Field of Classification Search
CPC ........ G06F 16/215; G06F 16/25; G06N 5/022
See application file for complete search history.

(56) References Cited

U.S. PATENT DOCUMENTS

| | | | |
|---|---|---|---|
| 10,657,018 B1 | 5/2020 | Nam et al. | |
| 2014/0351227 A1* | 11/2014 | Christodorescu | ........................... |
| | | | G06F 16/24556 |
| | | | 707/769 |
| 2018/0329738 A1* | 11/2018 | Kasha | ...................... G06F 8/71 |

(Continued)

FOREIGN PATENT DOCUMENTS

| | | |
|---|---|---|
| KR | 20200069353 A | 6/2020 |

OTHER PUBLICATIONS

English version of International Search Report and Written Opinion of the International Searching Authority in PCT Application No. PCT/IB2021/061525 issued on Mar. 4, 2022.

*Primary Examiner* — April Y Blair

(74) *Attorney, Agent, or Firm* — FINNEGAN, HENDERSON, FARABOW, GARRETT & DUNNER LLP

(57) ABSTRACT

Systems and methods for processing data for use in machine learning models, including receiving a request to generate a pipeline including two or more tasks, the request defining which features to ingest and output and instructions for processing the features; generating the pipeline including based on the request; for one or more producer tasks: retrieving the ingestible features from one or more databases, processing the features, and outputting curated features; for one or more consumer tasks: retrieving the ingestible features from a previous task in the pipeline upon which the consumer task depends, processing the features, and outputting curated features; storing the curated features associated with one or more tasks of the two or more tasks in a feature store; and providing the stored curated features associated with the one or more tasks of the two or more tasks to a machine learning model for ingestion.

18 Claims, 14 Drawing Sheets

(56) References Cited

U.S. PATENT DOCUMENTS

2019/0384640 A1* 12/2019 Swamy ................... G06F 9/453
2020/0242487 A1* 7/2020 Jain .......................... G06N 5/04

* cited by examiner

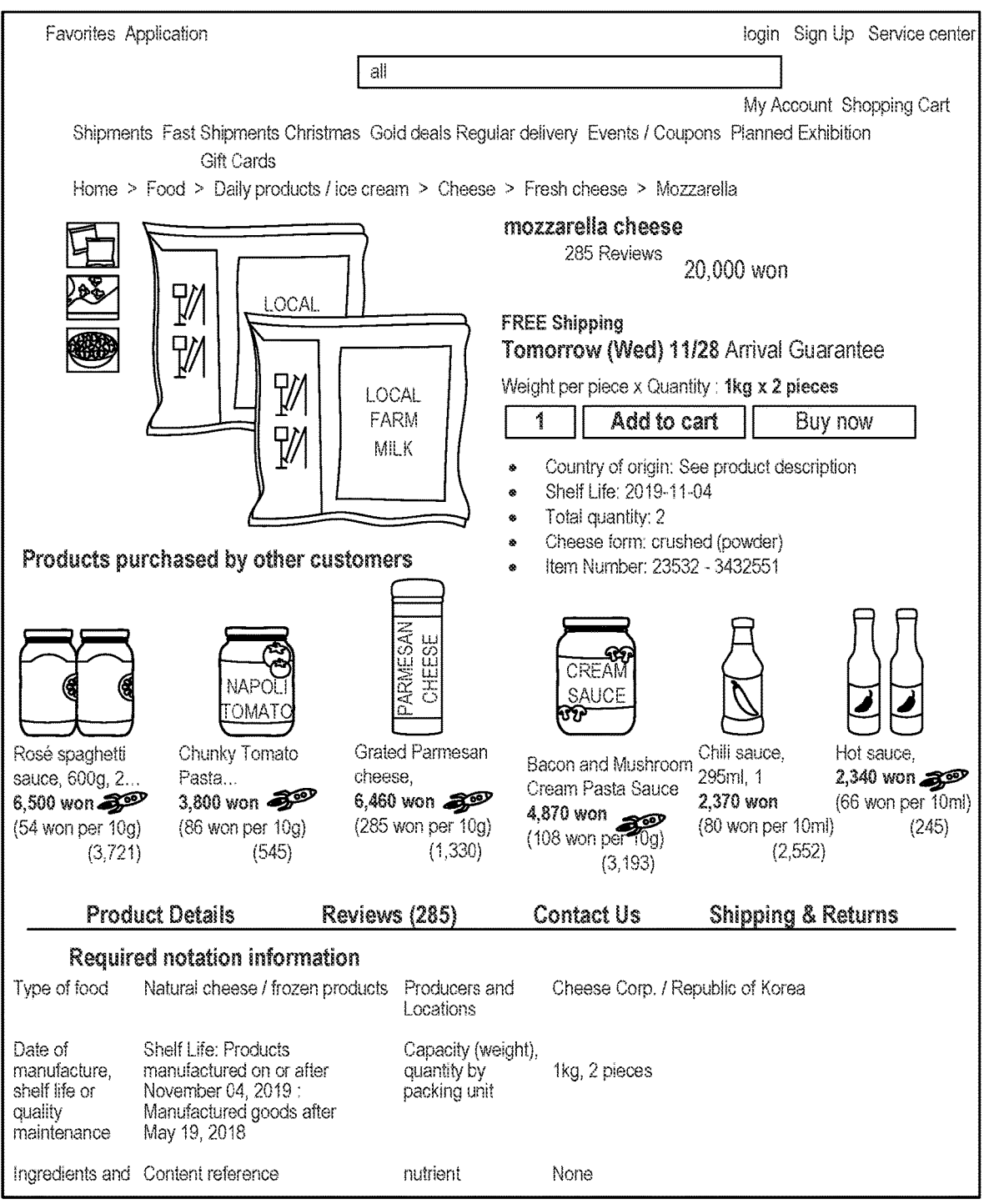

Favorites  Application login  Sign Up  Service center all

My Account  Shopping Cart

Shipments  Fast Shipments Christmas  Gold deals Regular delivery  Events / Coupons  Planned Exhibition
Gift Cards Home  >  Food  >  Daily products / ice cream  >  Cheese  >  Fresh cheese  >  Mozzarella mozzarella cheese
285 Reviews
20,000 won

FREE Shipping
Tomorrow (Wed) 11/28 Arrival Guarantee
Weight per piece x Quantity : 1kg x 2 pieces

| 1 | Add to cart | Buy now |

* Country of origin: See product description
* Shelf Life: 2019-11-04
* Total quantity: 2
* Cheese form: crushed (powder)
* Item Number: 23532 - 3432551

Products purchased by other customers

Rosé spaghetti
sauce, 600g, 2...
6,500 won
(54 won per 10g)
(3,721)

Chunky Tomato
Pasta...
3,800 won
(86 won per 10g)
(545)

Grated Parmesan
cheese,
6,460 won
(285 won per 10g)
(1,330)

Bacon and Mushroom
Cream Pasta Sauce
4,870 won
(108 won per 10g)
(3,193)

Chili sauce,
295ml, 1
2,370 won
(80 won per 10ml)
(2,552)

Hot sauce,
2,340 won
(66 won per 10ml)
(245)

| Product Details | Reviews (285) | Contact Us | Shipping & Returns |

Required notation information

| Type of food | Natural cheese / frozen products | Producers and Locations | Cheese Corp. / Republic of Korea |
|---|---|---|---|
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and | Content reference | nutrient | None |

FIG. 1C

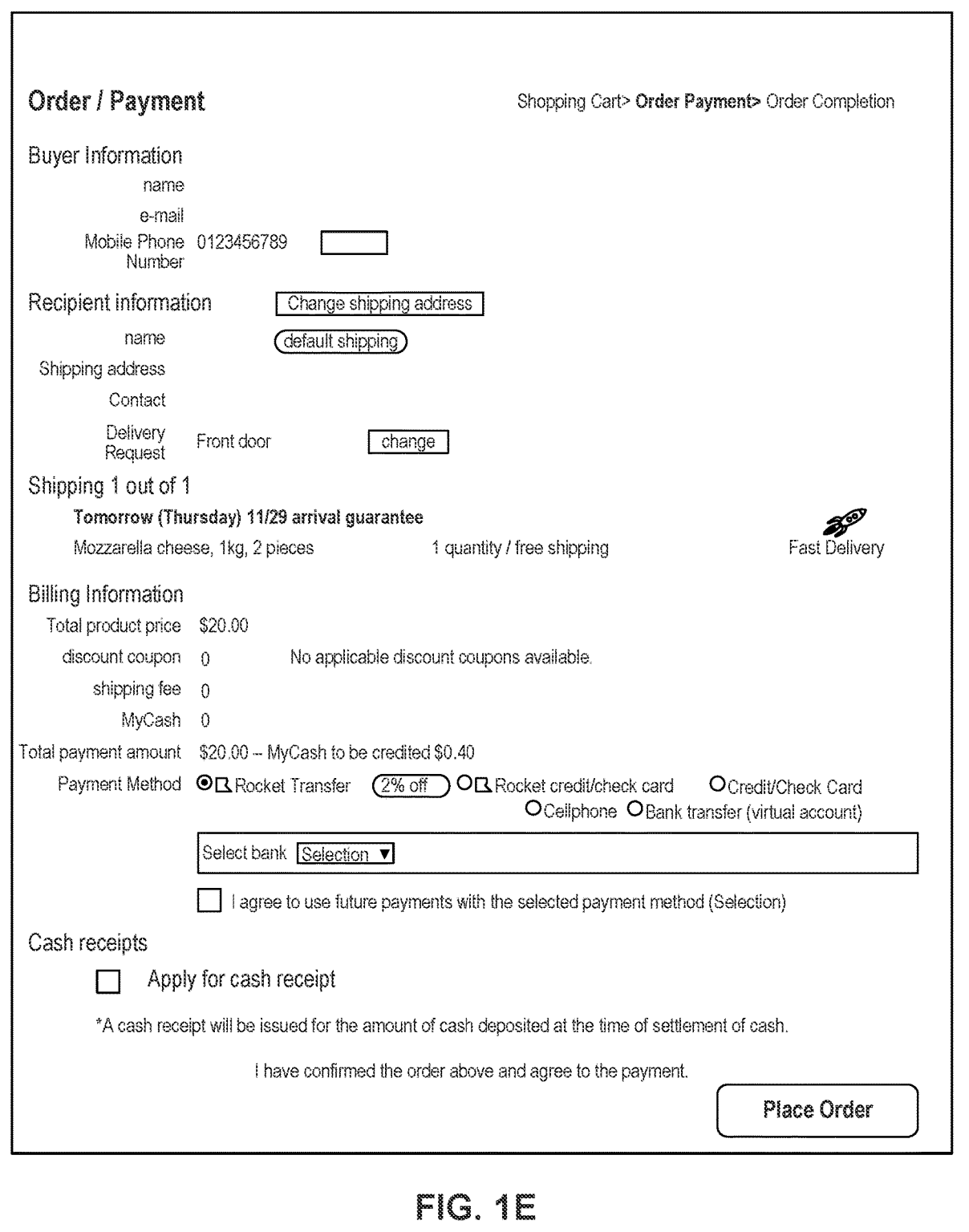

Order / Payment

Buyer Information name e-mail

Mobile Phone  0123456789  [        ]
Number

Recipient information  [ Change shipping address ]

name  ( default shipping )

Shipping address

Contact

Delivery  Front door  [ change ]
Request

Shipping 1 out of 1

Tomorrow (Thursday) 11/29 arrival guarantee

Mozzarella cheese, 1kg, 2 pieces      1 quantity / free shipping      Fast Delivery Billing Information Total product price  $20.00 discount coupon  0        No applicable discount coupons available.

shipping fee  0

MyCash  0

Total payment amount  $20.00 -- MyCash to be credited $0.40

Payment Method  ⊙⊡ Rocket Transfer  ( 2% off )  O⊡ Rocket credit/check card      O Credit/Check Card
O Cellphone  O Bank transfer (virtual account)

Select bank  [ Selection ▼ ]

☐ I agree to use future payments with the selected payment method (Selection)

Cash receipts

☐  Apply for cash receipt

*A cash receipt will be issued for the amount of cash deposited at the time of settlement of cash.

I have confirmed the order above and agree to the payment.

[ Place Order ]

FIG. 1E

```
                                                            700
name: forecast_sale kind: pipeline tasks:
        - forecast_outlet_model
        - forecast_seasonal_model
        - forecast_sale_model description: sale forecast owner: magdalena.ramos email: magdalena.ramos@email.com start_date: '2022-01-01T00:00:00-0500'
```

```
name: forecast_sale_model owner: Jessica Baumbach inputs:
      - sku_daily_sale
      - forecast_outlet_history
      - forecast_live_seasonal_peak outputs:
      - forecast_daily_sale_result
      - forecast_weekly_sale_result kind: task command:
      - /forecast/DEV/forecast-sale/run.sh sensors:
      - forecast_daily_inventory.yesterday
```

FIG. 7B

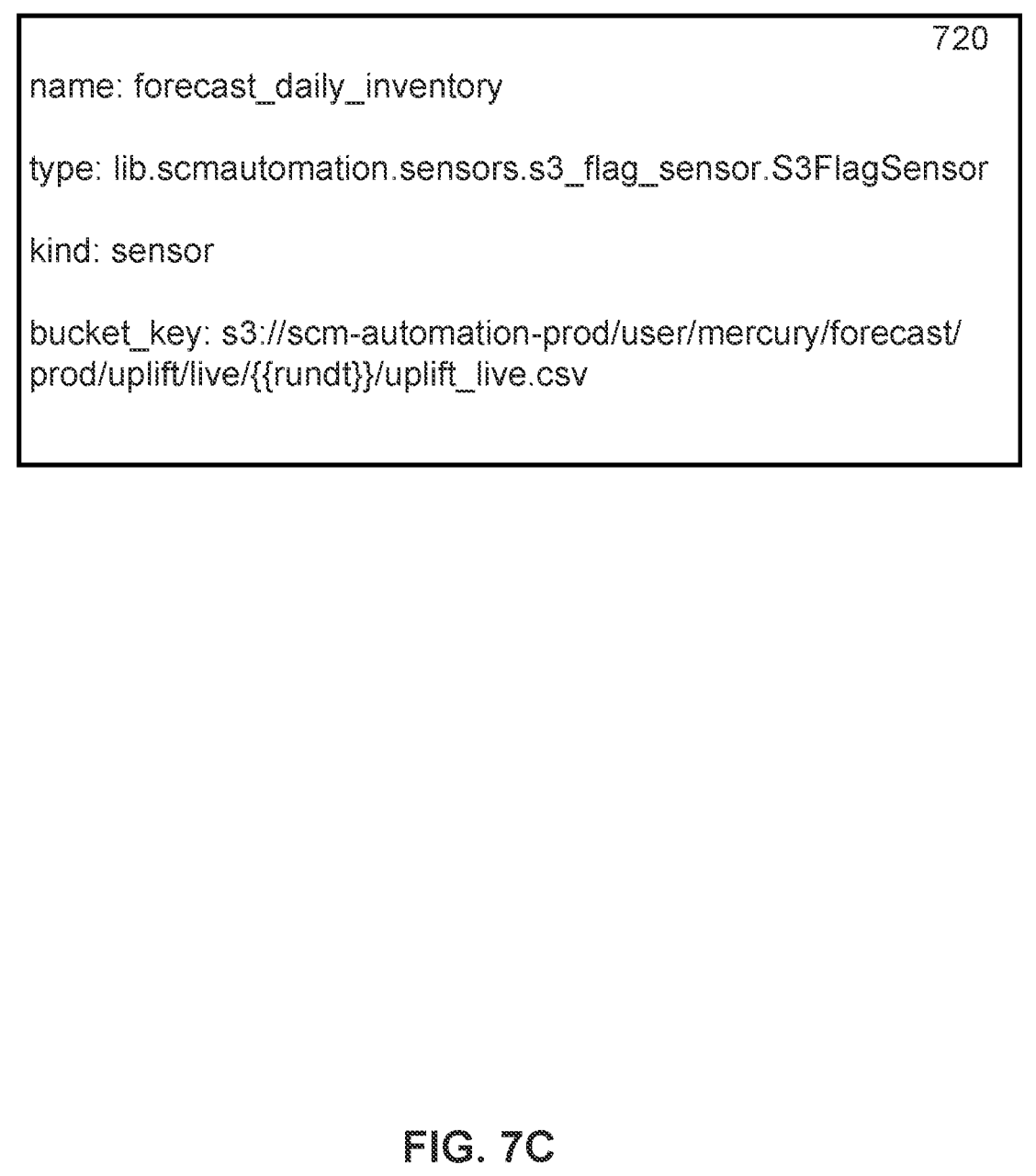

720 name: forecast_daily_inventory type: lib.scmautomation.sensors.s3_flag_sensor.S3FlagSensor kind: sensor bucket_key: s3://scm-automation-prod/user/mercury/forecast/
prod/uplift/live/{{rundt}}/uplift_live.csv

FIG. 7C

Feature Store                                                     800

| | Index | Name | Creator | Description | Tags |
|---|---|---|---|---|---|
| [+] | 0 | winter_index_dev | tshepo.okafor | winter index dev | DEV |
| [+] | 1 | winter_index | tshepo.okafor | winter index | PROD |
| [+] | 2 | summer_index | tshepo.okafor | summer index | PROD |
| [-] | 3 | forecast_sale | magdalena.ramos | sale forecast | DEV |

| Feature Name | Data Type | Description | Action |
|---|---|---|---|
| forecast_daily_sale_result | integer | | Update \| Delete |
| forecast_weekly_sale_result | array | | Update \| Delete |

| | Index | Name | Creator | Description | Tags |
|---|---|---|---|---|---|
| [+] | 4 | sku_unitsold | jessica.baumbach | daily SKU sales | DEV |

FIG. 8

SYSTEMS AND METHODS FOR PROCESSING DATA FOR STORING IN A FEATURE STORE AND FOR USE IN MACHINE LEARNING

CROSS-REFERENCE TO RELATED APPLICATIONS

This application claims the benefit of priority to U.S. Provisional Application No. 63/123,925, filed Dec. 10, 2020, which is incorporated herein in its entirety.

TECHNICAL FIELD

The present disclosure generally relates to computerized methods and systems for maintaining a feature store. In particular, embodiments of the present disclosure relate to inventive and unconventional systems for building and maintaining a feature store for processing data for use in machine learning models.

BACKGROUND

Machine learning is a powerful tool with the potential to move data analysis from a historical understanding of the world to a predictive modeling of the world. However, building machine learning systems is difficult and requires specialized platforms, tools, and a deep understanding of the technology by a user. Although feature engineering and training pipelines designed specifically for a machine learning model may be a quick way for a data scientist to experiment with a machine learning model, over time, such pipelines have a tendency to become far too complex for the data scientist to handle. As the number of models and features increases, it quickly becomes impossible to manage.

Conventional systems and methods suffer from the assembly of technical debt, including an inability to access features during model serving, the inefficiency of reusing features between multiple machine learning pipelines, an isolation of data science projects which work without collaboration or reuse, features used for training and serving being inconsistent, an inability to determine which features need to be recomputed when new data arrives, which results in an entire pipeline needing to be run to update features.

Therefore, there is a need for systems and methods for processing data for storage in a feature store for easy retrieval and for use in machine learning models. Embodiments of the present disclosure include systems and methods that standardize feature curating for a plurality of machine learning models and reduce the complexity of having a greater number of models and more intricate pipelines. These embodiments also help reduce the technical cost and time of developing new machine learning models.

SUMMARY

One aspect of the present disclosure is directed to a computer-implemented system for processing data for use in machine learning models. The system may include a memory storing instructions; and one or more processors configured to execute operations including: receiving a request to generate a pipeline including two or more tasks, the request defining for each of the two or more tasks which features to ingest, which features to output, and instructions for processing the features; generating the pipeline including the two or more tasks based on the request; for one or more producer tasks of the two or more tasks: retrieving the ingestible features from one or more databases, processing the features based on the received instructions, and outputting curated features; for one or more consumer tasks of the two or more tasks: retrieving the ingestible features from a previous task in the pipeline upon which the consumer task depends, processing the features based on the received instructions, and outputting curated features; storing the curated features associated with one or more tasks of the two or more tasks in a feature store; and providing the stored curated features associated with the one or more tasks of the two or more tasks to a machine learning model for ingestion.

Yet another aspect of the present disclosure is directed to a computer-implemented method for processing data for use in machine learning models. The method may include: receiving a request to generate a pipeline including two or more tasks, the request defining for each of the two or more tasks which features to ingest, which features to output, and instructions for processing the features; generating the pipeline including the two or more tasks based on the request; for one or more producer tasks of the two or more tasks: retrieving the ingestible features from one or more databases, processing the features based on the received instructions, and outputting curated features; for one or more consumer tasks of the two or more tasks: retrieving the ingestible features from a previous task in the pipeline upon which the consumer task depends, processing the features based on the received instructions, and outputting curated features; storing the curated features associated with one or more tasks of the two or more tasks in a feature store; and providing the stored curated features associated with the one or more tasks of the two or more tasks to a machine learning model for ingestion.

Still further, another aspect of the present disclosure is directed to a computer-implemented system for processing data for use in machine learning models. The system may include: a memory storing instructions; and one or more processors configured to execute operations comprising: receiving a request to generate a pipeline including two or more tasks and one or more sensors, the request defining for each of the two or more tasks which features to ingest, which features to output, and instructions for processing the features, and the sensors being configured to monitor at least one external trigger; generating the pipeline including the two or more tasks based on the request; for one or more producer tasks of the two or more tasks, at predetermined time intervals: retrieving the ingestible features from one or more databases, processing the features based on the received instructions, and outputting curated features; for one or more consumer tasks of the two or more tasks, at predetermined time intervals: retrieving the ingestible features from a previous task in the pipeline upon which the consumer task depends, processing the features based on the received instructions, and outputting curated features; storing the curated features associated with one or more tasks of the two or more tasks in a feature store; rendering a user interface based on the request, the user interface including a user-editable Directed Acyclic Graph (DAG) and a metadata browser specifying data about the stored curated features; and providing the stored curated features associated with the one or more tasks of the two or more tasks to a machine learning model for ingestion.

Other systems, methods, and computer-readable media are also discussed herein.

BRIEF DESCRIPTION OF THE DRAWINGS

FIG. 1C depicts a sample Single Display Page (SDP) that includes a product and information about the product along with interactive user interface elements, consistent with the disclosed embodiments.

FIG. 1E depicts a sample Order page that includes items from the virtual shopping cart along with information regarding purchase and shipping, along with interactive user interface elements, consistent with the disclosed embodiments.

FIG. 7A illustrates an exemplary request for a user to request generation of a pipeline, consistent with the disclosed embodiments.

FIG. 7B illustrates an exemplary request for a user to request generation of a task, consistent with the disclosed embodiments.

FIG. 7C illustrates an exemplary request for a user to request generation of a sensor, consistent with the disclosed embodiments.

FIG. 8 illustrates an example of a representation of data which may be contained within a feature store and displayed via a user device to provide a user with data regarding one or more curated features, consistent with the disclosed embodiments.

DETAILED DESCRIPTION

Figure 1A:
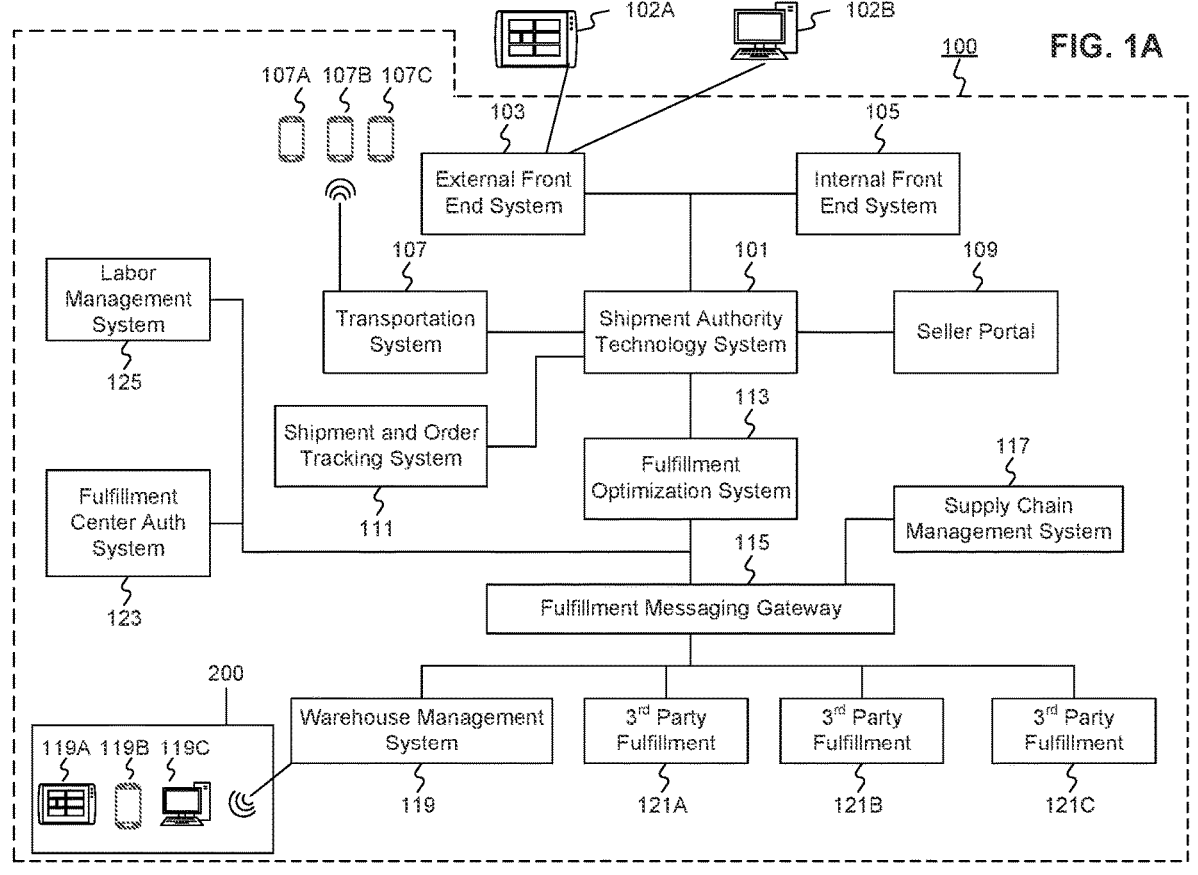
FIG. 1A is a schematic block diagram illustrating an exemplary embodiment of a network comprising computerized systems for communications enabling shipping, transportation, and logistics operations, consistent with the disclosed embodiments.
Figure 1B:
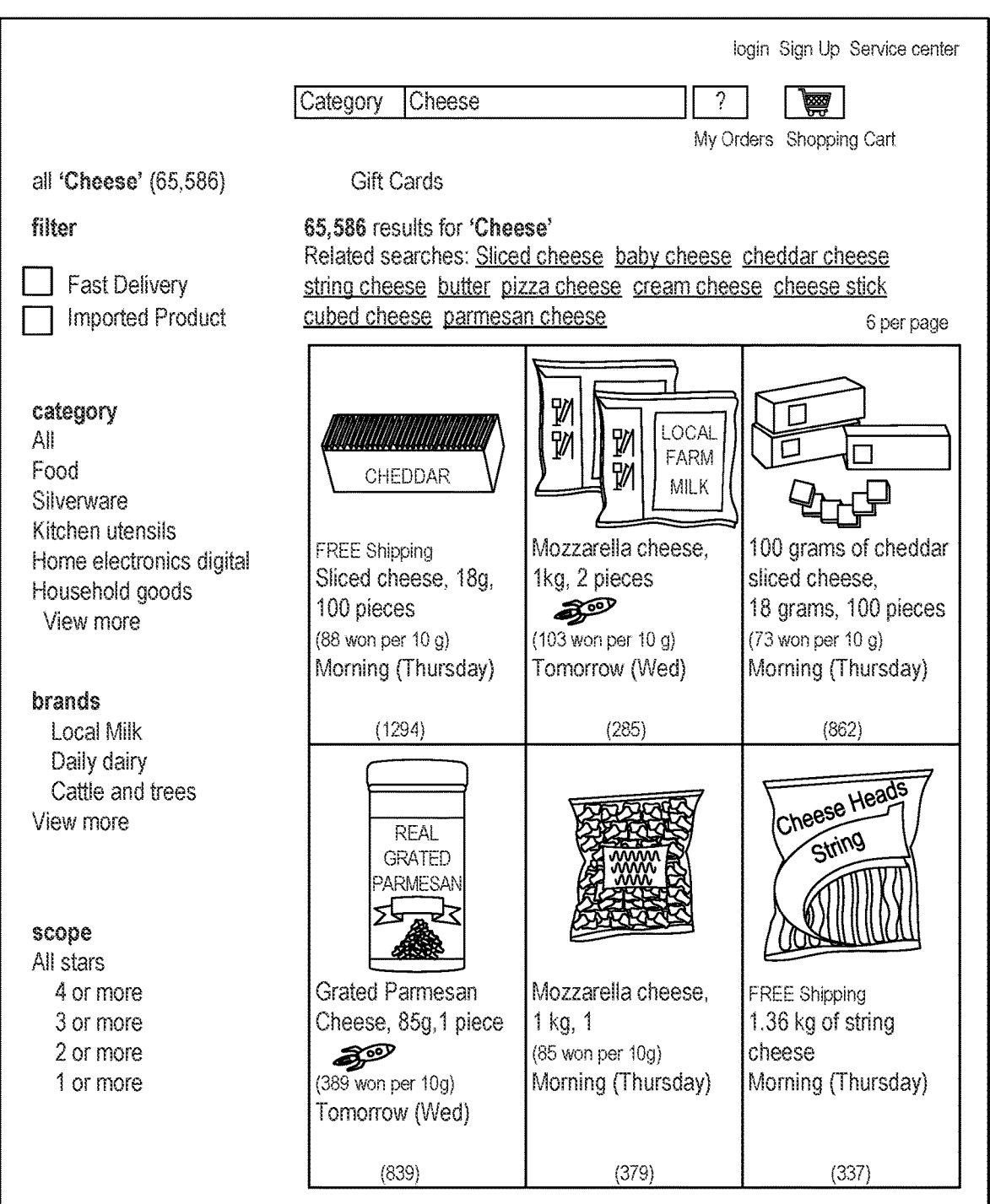
FIG. 1B depicts a sample Search Result Page (SRP) that includes one or more search results satisfying a search request along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computerized methods and systems that process data for storage in a feature store and for use in machine learning models.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
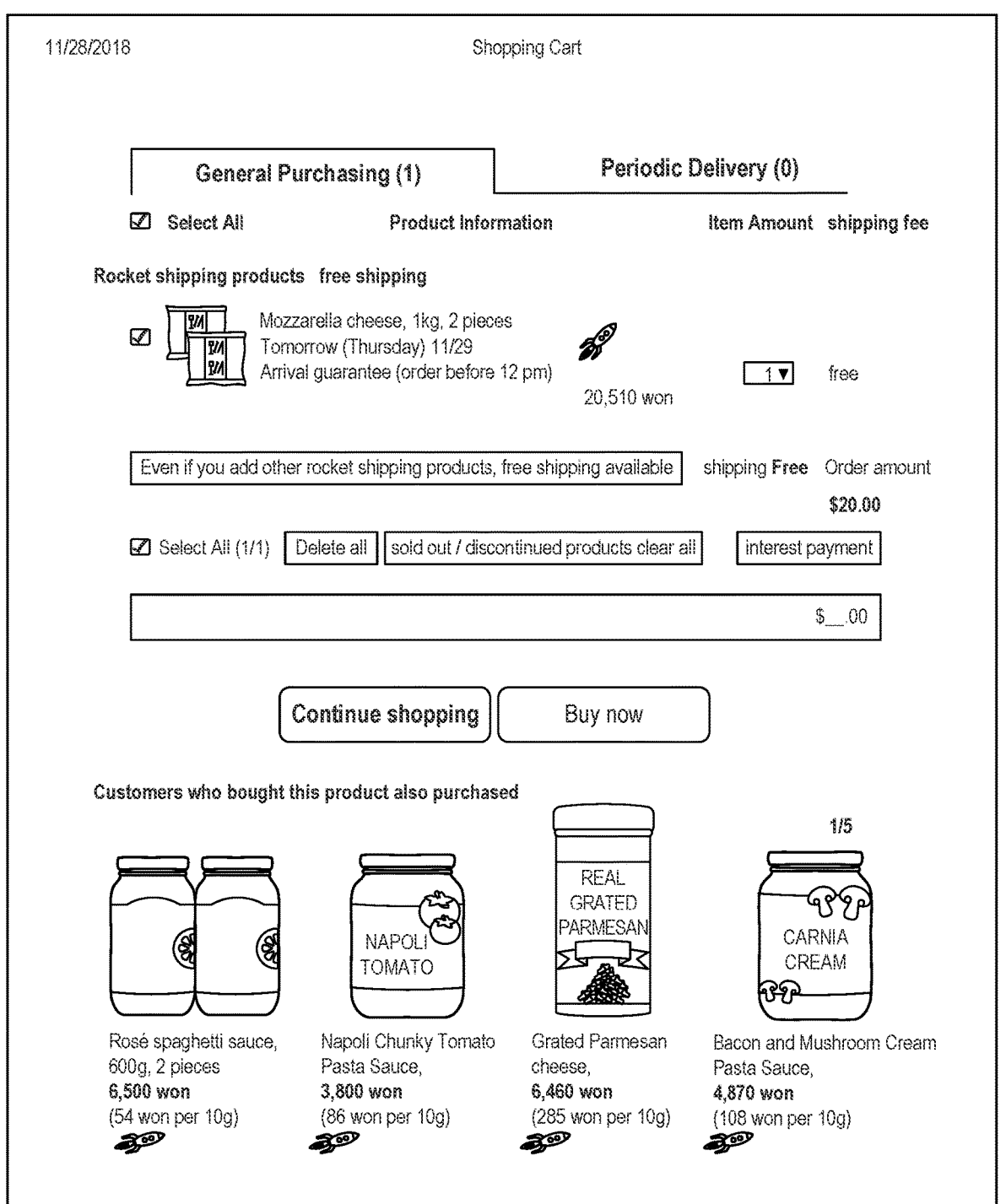
FIG. 1D depicts a sample Cart page that includes items in a virtual shopping cart along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with at least one of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3rd party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
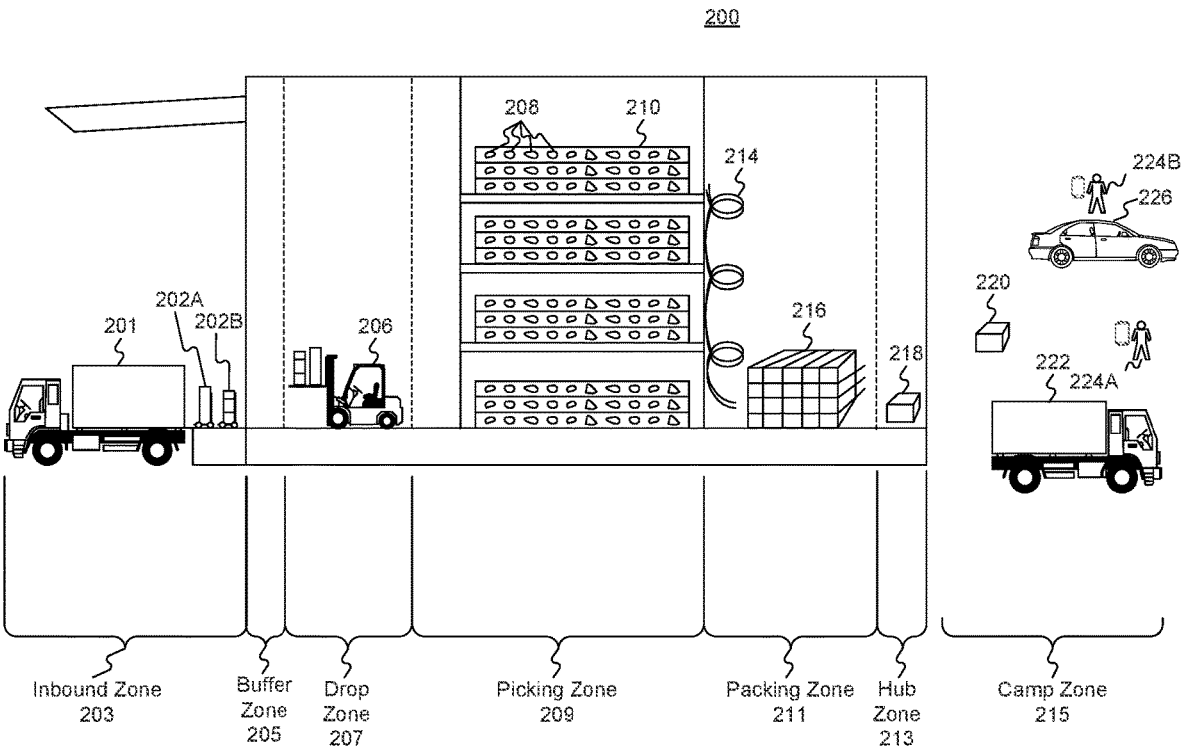
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC)

200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1196.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
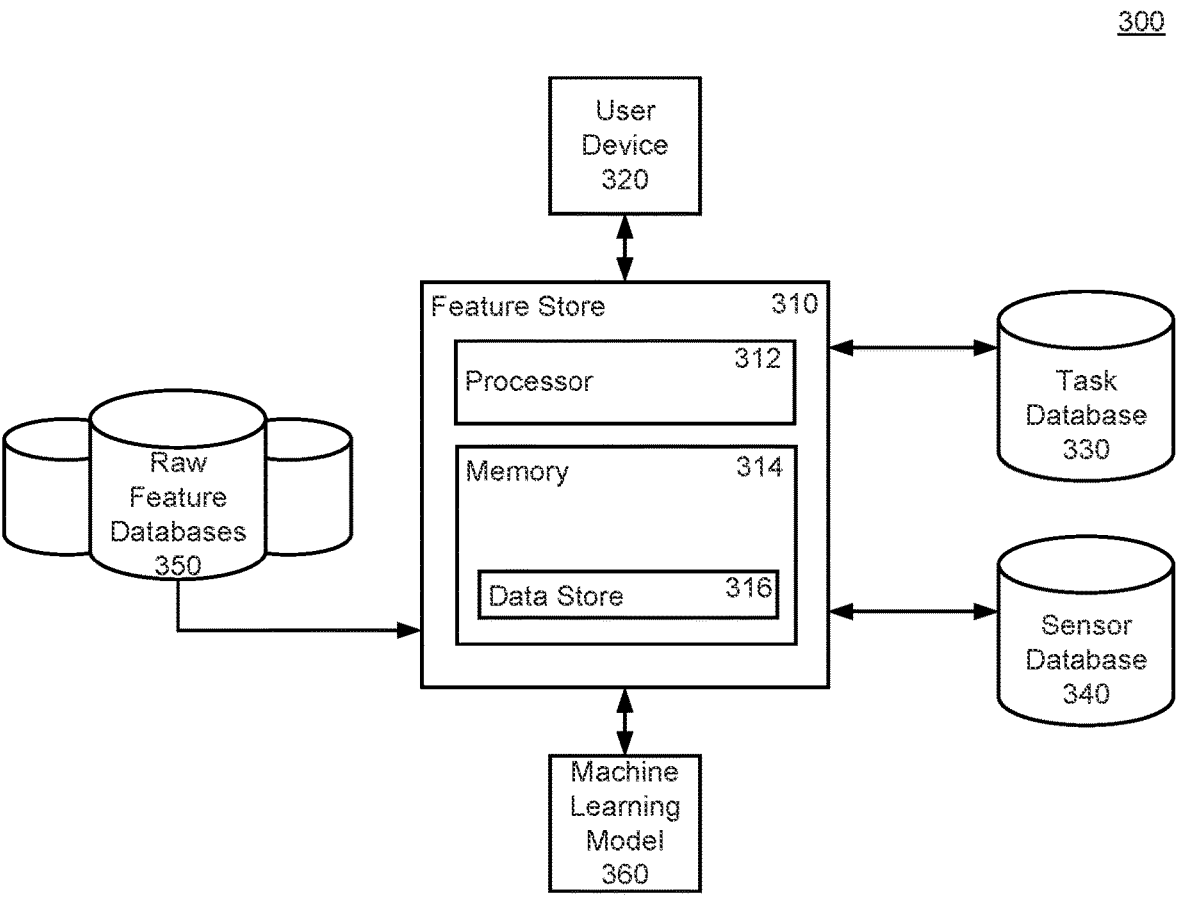
FIG. 3 is a schematic block diagram illustrating an exemplary embodiment of a system including a feature store configured to process data for use in a machine learning model, consistent with the disclosed embodiments.

FIG. 3 is a schematic block diagram illustrating an exemplary embodiment of a system 300 including a feature store configured to process data for use in a machine learning model. System 300 may include a variety of computerized systems, each of which may be connected to each other via one or more networks. In some embodiments, each of the elements depicted in FIG. 3 may represent a group of systems, individual systems in a network of systems, functional units or modules inside a system, or any combination thereof. And in some embodiments, each of the elements may communicate with each other via one or more public or private network connections including the Internet, an intranet, a WAN (Wide-Area Network), a MAN (Metropolitan-Area Network), a wireless network compliant with the IEEE 802.11a/b/g/n Standards, a wired network, or the like. The individual systems may also be located within one geographical location or be geographically dispersed.

In some embodiments, the depicted systems may include a feature store 310, a user device 320, a task database 330, a sensor database 340, a plurality of raw feature databases 350, and a machine learning model 360. While a number of databases, machine learning models, and user devices are depicted in FIG. 3, the number is only exemplary and fewer or additional databases, machine learning models, and user devices may be implemented.

Each system depicted in FIG. 3 may take the form of a server, general-purpose computer, a mainframe computer, a special-purpose computing device such as a graphical processing unit (GPU), laptop, or any combination of these computing devices. In other embodiments, each system or a subset of the systems may be implemented as one or more functional units of a single system. Additionally or alternatively, each system or a subset thereof may be a standalone system, or a part of a subsystem, which may be part of a larger system.

Feature store 310, in some embodiments, may be any computerized system configured to process and store data for use in a machine learning model. In some embodiments, the data may include features, which may refer to a measurable property of a data sample. For instance, a feature may be an image-pixel, a word from a text string, a person's age, a coordinate emitted from a sensor, an aggregate value such as the average number of purchases within the last hour, etc. Features may be extracted directly from files and/or database tables, or may be derived values, computed from one or more data sources. Features may be used by machine learning models for training so that the machine learning models may make predictions for feature values which do not yet exist. Feature store 310 may include one or more processors 312 and a memory 314 which may include a data store 316. Memory 314 may be configured to store a plurality of programs and/or instructions for execution by processor 312, and may, in some embodiments, comprise random access memory, flash memory, a hard disk, or the like. The programs and/or instructions are described in more detail below with reference to FIG. 4.

Processor 312 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of feature store

310. Processor 312 may execute programs or instructions contained in memory 314 to process and store data for use in a machine learning model.

User device 320, in some embodiments, may be any computerized system at least configured to allow a user to send a request to generate a pipeline, display a user interface, and receive input from a user through the user interface. User device 320 may be one or more of mobile device 102A, computer 102B, mobile devices 107A-107C, external front end system 103, internal front end system 105, mobile devices 119A-119C, or any other system depicted in FIG. 1A. In some embodiments, user device 320 may be configured to receive and send data to feature store 310 via the disclosed network. User device 320 may be a personal computing device including, but not limited to, a smartphone, a laptop or notebook computer, a tablet, a multifunctional watch, a pair of multifunctional glasses, any mobile or wearable device with computing ability, or any combination of these computers and/or affiliated components.

Task database 330, in some embodiments, may be used to store one or more tasks which may be used by processor 312 to process data for use in a machine learning model. Task database 330 may include one or more memory devices that store information and may be accessed and/or managed by one or more components of system 300. By way of example, task database 330 may include Oracle™ databases, Sybase™ databases, or other relational databases or nonrelational databases, such as Hadoop sequence files, HBase, or Cassandra. Task database 330 may include computing components (e.g., database management system, database server, etc.) configured to receive and process requests for data stored in memory devices of task database 330 and to provide data from task database 330. In some embodiments, task database 330 may be configured to receive and send data to feature store 310 via the disclosed network. In another embodiment, feature store 310 may store task database 330 locally within it. By way of example, task database 330 may be stored in memory 314. In some embodiments, task database 330 may include at least predetermined tasks and/or tasks defined by a user operating user device 320.

Sensor database 340, in some embodiments, may be used to store one or more sensors which may be used by processor 312 to monitor an external trigger. In some embodiments, sensors may protect processor 312 from taking a premature reading of a feature. A sensor, in some embodiments, may refer to a piece of software which monitors and/or waits on at least one external trigger by sampling the status of the external trigger. Sensor database 340 may include one or more memory devices that store information and may be accessed and/or managed by one or more components of system 300. By way of example, sensor database 340 may include Oracle™ databases, Sybase™ databases, or other relational databases or nonrelational databases, such as Hadoop sequence files, HBase, or Cassandra. Sensor database 340 may include computing components (e.g., database management system, database server, etc.) configured to receive and process requests for data stored in memory devices of sensor database 340 and to provide data from sensor database 340. In some embodiments, sensor database 340 may be configured to receive and send data to feature store 310 via the disclosed network. In another embodiment, feature store 310 may store sensor database 340 locally within it. By way of example, sensor database 340 may be stored in memory 314. In some embodiments, sensor database 340 may include at least predetermined sensors and/or sensors defined by a user operating user device 320.

In some embodiments, raw feature databases 350 may be used to store a plurality of raw features which may be used by processor 312 as inputs to one or more tasks in a pipeline in order to generate curated features for use in a machine learning model. raw feature databases 350 may include one or more memory devices that store information and may be accessed and/or managed by one or more components of system 300. By way of example, raw feature databases 350 may include Oracle™ databases, Sybase™ databases, or other relational databases or nonrelational databases, such as Hadoop sequence files, HBase, or Cassandra. raw feature databases 350 may include computing components (e.g., database management system, database server, etc.) configured to receive and process requests for data stored in memory devices of raw feature databases 350 and to provide data from raw feature databases 350. In some embodiments, raw feature databases 350 may be configured to receive and send data to feature store 310 via the disclosed network. In another embodiment, feature store 310 may store raw feature databases 350 within it. By way of example, raw feature databases 350 may be stored in memory 314. In some embodiments, raw feature databases 350 may at least include raw features generated automatically by an external system, by processor 312, and/or by a user operating user device 320.

Machine learning model 360, in some embodiments, may include but is not limited to any of classification models, neural network models, random forest models, Convolutional Neural Network Models, deep learning models, recurrent Neural network models, support vector machine models, a support vector machine learning model, ensemble prediction models, Adaptive Network Based Inference Systems, or any other machine learning model. Machine learning model 360, in some embodiments, may be implemented as software operable on a server, a general-purpose computer, a mainframe computer, a special-purpose computing device such as a graphical processing unit (GPU), laptop, or any combination of these computing devices. As one of skill in the art will appreciate, machine learning may include training a model to perform a task, the training including providing example training data to the model and iteratively optimizing model parameters until training criteria are satisfied. For example, a model may be trained to classify data using labelled datasets. In some embodiments, a model may be trained to use training input data to produce an output that closely matches training output data. Model training may include hyperparameter tuning, sizing of mini-batches, regularization, or changes in network architectures. It should be understood that systems and methods contemplated herein include using available machine learning platforms and/or libraries to train and/or manage models (e.g., TENSOR-FLOW, PYTHON, MATLAB, KERAS, MICROSOFT COGNITIVE TOOLKIT, and/or any other machine learning platform). In some embodiments, training of machine learning models may be supervised and/or unsupervised. In some embodiments, machine learning model 360 may be configured to receive and send data to feature store 310 via the disclosed network.

Figure 4:
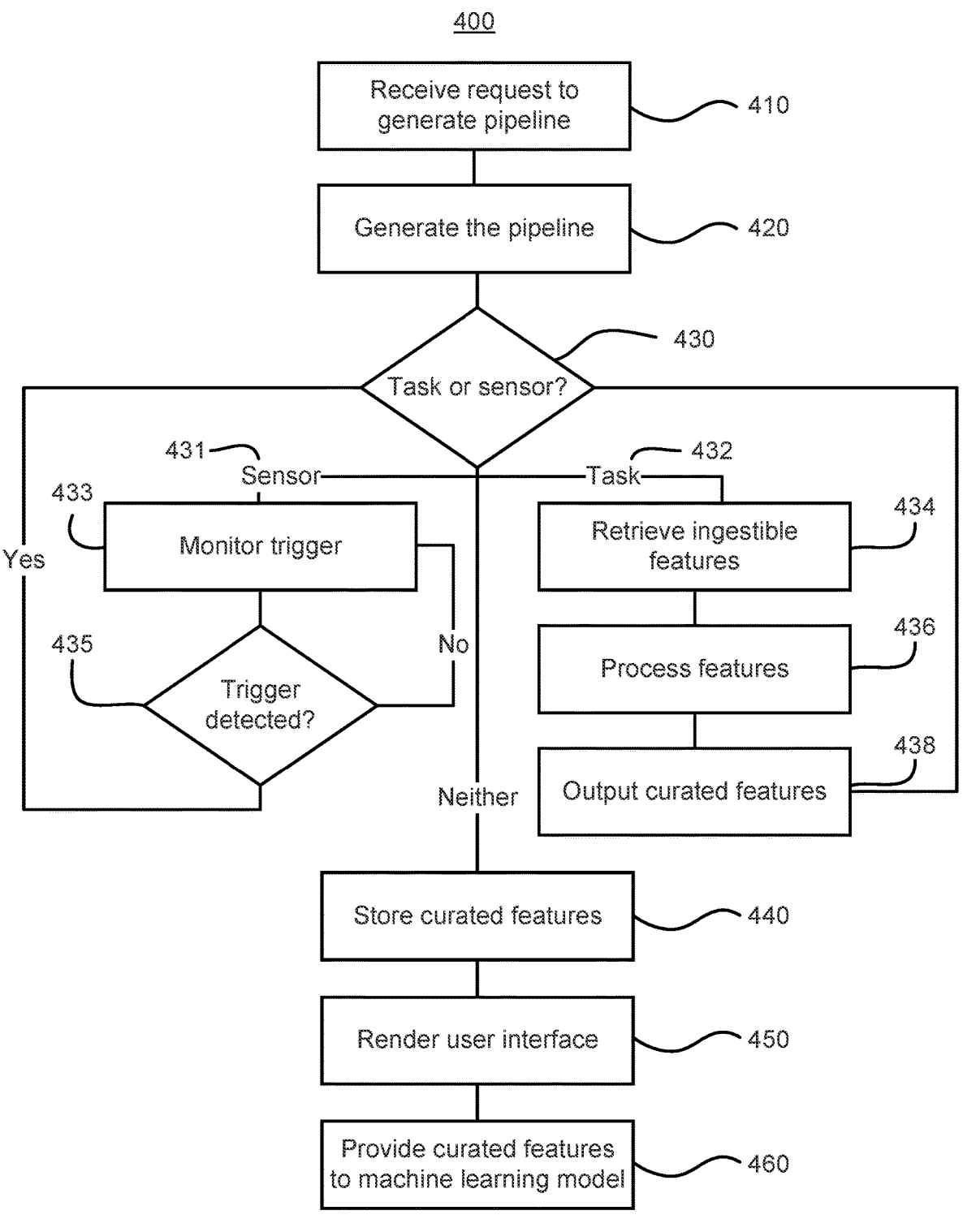
FIG. 4 is a flowchart of an exemplary computerized method for processing data for use in a machine learning model, consistent with the disclosed embodiments.

FIG. 4 is a flowchart of an exemplary computerized method 400 for processing data for use in a machine learning model. Method 400 may be implemented utilizing data stored in any system which may provide data to a machine learning model (implemented on a system as discussed above with respect to FIG. 3), such as, for example, SAT system 101, external front end system 103, internal front end system 105, transportation system 107, SOT system 111, FO system 113, SCM system 117, warehouse management system 119, 3rd party fulfillment systems 121A, 121B, and 121C, FC Auth 123, and/or LMS 125. Such system may include networked systems such as those described above in FIG. 3. Method 400 is described below with reference to the networked systems of FIG. 3, but any other configuration of systems, subsystems, or modules may be used to perform method 400.

At step 410, processor 312 may receive a request to generate a pipeline. In some embodiments, user device 350 may send a signal via the disclosed network. In some embodiments, the request may include one or more tasks and/or one or more sensors. A task may be one or more operations which consume input data and/or generate output data. The input data may be raw features from raw feature database 350 and/or curated features from a preceding task in the pipeline. In some embodiments, for each task of the one or more tasks, the request may define which features to ingest, which features to output, and instructions for processing the features. In some embodiments, the request may include information specifying one or more of where to locate the ingestible features for retrieval (e.g., from raw feature databases 350 or a previous task), a data quality expectation (e.g., a measure of the validity of the data values, including identification of missing or unusable data, data in conflict, duplicate records, and/or missing links between data), sensors, an owner (e.g., a user who submits a request or is otherwise associated with the request), or a timeframe (e.g., a period of time during which the pipeline will operate).

A sensor may refer to a poller which monitors and/or waits on at least one external trigger by gathering information about the status of a variable or external device via the disclosed network. A sensor may be coupled with a task to protect the task from taking as input premature features which are not yet ready for consumption. For instance, a sensor may be a piece of software which sends a periodic request to an external system asking it to send back a particular variable, and checking to see if the received particular variable exceeds a certain threshold or is otherwise considered to 'trigger' the sensor. One or more sensors used by processor 312 may be stored in sensor database 340.

In some embodiments, the request may define which curated features produced by the tasks in the pipeline to store in feature store 310 and which curated features to provide to machine learning model 360. The request to generate a pipeline is described in greater detail below with reference to FIG. 7A. In addition, user device 350 may send a request to generate a task or a sensor, as described in greater detail below with reference to FIGS. 7B and 7C, respectively.

Figure 5:
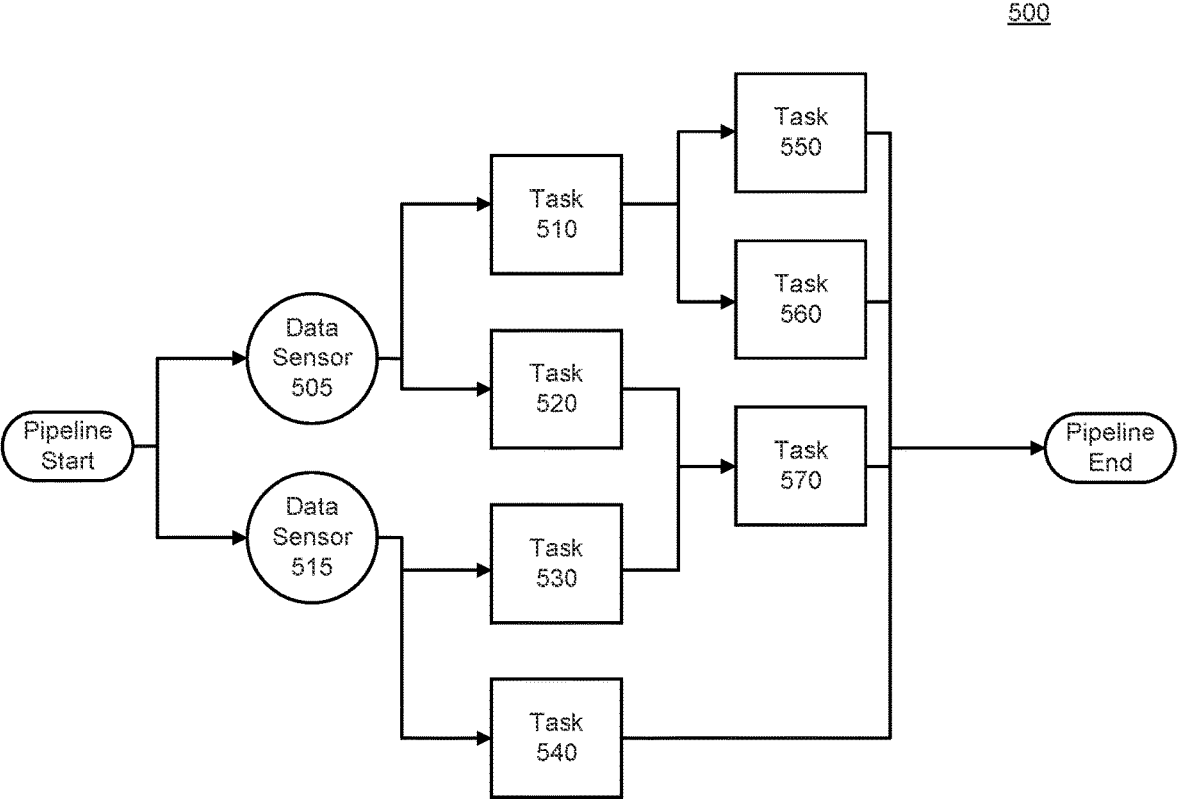
FIG. 5 is a directed acyclic graph of an exemplary pipeline for processing data for use in a machine learning model, consistent with the disclosed embodiments.

At step 420, processor 312 may generate the pipeline based on the request. The pipeline may include one or more tasks and/or one or more sensors. Processor 312 may retrieve the one or more tasks and/or the one or more sensors from task database 330 and sensor database 340, respectively. Processor 312 may generate the pipeline as a directed acyclic graph (DAG), as depicted in FIG. 5, which depicts an exemplary pipeline 500 including data sensors 505 and 515, and tasks 510, 520, 530, 540, 550, 560, and 570. FIG. 5 may be used herein as a non-limiting example to aid in the description of method 400 of FIG. 4. In some embodiments, processor 312 may render a user interface on user device 320 based on the request including a user-editable DAG. The user interface may be rendered based on one or more of tasks, sensors, ingestible features, curated features, owner, timeframe, and commands.

At step 430, processor 312 may determine whether a next object in the generated pipeline is a task or a sensor, or if there is no next object. For instance, at the start of pipeline 500 of FIG. 5, processor 312 may determine at step 430 that a first object is data sensor 505 and may follow sensor path 431 of method 400. At a later point, following a detection of a trigger for data sensor 505, as described in greater detail below with respect to step 435, method 400 may return to step 430 and determine that the next object in pipeline 500 is task 510. In some embodiments, processor 312 may make the determination of step 430 concurrently at multiple nodes of the DAG. For example, processor 430 may determine that the operations for two sensors, data sensors 505 and 515, may be performed concurrently. This may lead to a detection of a trigger in one sensor and not in the other. For instance, a detection of a trigger in data sensor 505 may lead processor 312 to perform the operations of at least tasks 510, 520, 550, and 560 while data sensor 515 is still monitoring its trigger.

At another point, method 400 may return to 430, where processor 312 may determine that there are no further sensors or tasks to process, and method 400 may proceed to step 440. Additionally or alternatively, method 400 may proceed to step 440 irrespective of whether processor 312 has performed the steps of sensor path 431 and task path 432, and may perform one or more of steps 440, 450, and 460 concurrently, before, or after the steps of sensor path 431 and task path 432.

Following the determination at step 430 that a next object in the pipeline is a sensor, method 400 may proceed to sensor path 431, which includes steps 433 and 435. At step 433, processor 312 may monitor an external trigger. For example, processor 312 may send a periodic request to an external system asking it to send back a particular variable, and checking to see if the received particular variable exceeds a certain threshold or is otherwise considered to 'trigger' the sensor. An external trigger, in some embodiments, may refer to a procedure which is invoked whenever an event is detected, wherein the detected event takes place outside sensor database 340 where the sensor is stored. For instance, an external trigger may be a value of a feature in raw feature databases 350 exceeding a certain threshold, an operation of a task being performed, a user input from user device 320, a condition in a component of system 300 being met, a condition in a system external to system 300 being met, or any other appropriate event which may take place outside of sensor database 340.

At step 435, processor 435 may determine whether the monitored external trigger has been detected. If the trigger has not been detected, method 400 may return to step 433 to continue monitoring the trigger. However, if the trigger has been detected, method 400 may return to step 430 to determine whether a next object in the pipeline is another sensor or a task.

By way of example, referring to FIG. 5, processor 312 may determine that a first object in pipeline 500 is data sensor 505. Processor 312 may then monitor the external trigger of data sensor 505 until the trigger is detected, at which point processor 312 may proceed to perform the operations of at least tasks 510, 520, 550, and 560. Alternatively, processor 312 may determine that there is more than one first object in pipeline 500, i.e., data sensor 515. In this case, processor 312 may monitor the external triggers of both data sensors 505 and 515 concurrently until the trigger is detected for one or both of data sensors 505 and 515. Once the external trigger is detected for at least one of data sensors 505 or 515, processor 312 may perform the operations for the following objects. For instance, if only the external trigger of data sensor 505 is detected, processor 312 may perform the operations of tasks 510, 520, 550, and 560. In another case, if only the external trigger of data sensor 515 is detected, processor 312 may perform the operations of tasks 530 and 540. In yet another case, if both the external triggers of data sensors 505 and 515 are detected, processor 312 may perform the operations of all tasks 510, 520, 530, 540, 550, 560, and 570.

Following the determination at step 430 that a next object in the pipeline is a task, method 400 may proceed to task path 432, which includes steps 434, 436, and 438. A task may consume input data and include one or more operations which generate output data. At step 434, processor 312 may retrieve ingestible features from one or more databases, including at least from raw feature databases 350 and/or a previous task in the pipeline. By way of example, at task 510 of FIG. 500, processor 312 may retrieve ingestible features from raw feature databases 350, while at task 550, processor 312 may retrieve ingestible features from at least task 510 and optionally raw feature databases 350. As another example, at task 570, processor 312 may retrieve ingestible features from at least tasks 520 and 530 and optionally raw feature databases 350. In some embodiments, processor 312 may retrieve ingestible features at predetermined time intervals, at a predetermined time of day, or following a trigger.

At step 436, processor 312 may process the ingestible features based on the received instructions. That is, the instructions may include information regarding which operations to apply to the ingestible features to produce the desired results. In some embodiments, processing the features may include one or more of aggregation (e.g., gathering and providing data in a summarized format, for instance turning multiple entries associated with one SKU into a single entry, while not losing or only losing a portion of the initial data), data quality improvement (e.g., one or more of identification and resolving of missing or unusable data, data in conflict, duplicate records, and/or missing links between data), data cleansing (e.g., detecting and correcting corrupt or inaccurate features by identifying incomplete, incorrect, inaccurate, or irrelevant parts of the data and replacing, modifying, or deleting the dirty or coarse data), data preprocessing (e.g., transforming raw features into a useful and efficient format for use in a machine learning model), joining (e.g., combining data based on a common data point, i.e., a join key), filtering (e.g., choosing a smaller part of a data set based on one or more rules), encoding (e.g., putting a sequence of characters (letters, numbers punctuation, and certain symbols) into a specialized format for efficient transmission or storage), normalizing (e.g., transforming the features to scale the values in a specified range (e.g., −1.0 to 1.0, 0.0 to 1.0, etc.)), binning (e.g., dividing sorted data into segments of equal size and smoothing each segment), hashing (e.g., passing data through a formula to produce a result), computing polynomial features (e.g., raising raw features to an exponent), representation learning (e.g., reducing highdimensional data to low-dimensional data to make it easier to find patterns and anomalies), regression (e.g., smoothing data by fitting it to a regression function), clustering (e.g., grouping similar data in a cluster), feature selection (e.g., constructing new features from a given set of features), discretization (e.g., replacing raw values of numeric features by interval levels or conceptual levels), concept hierarchy generation (e.g., converting features from a lower level to a higher level, for instance, a feature of "city" may be converted into "country"), data cube aggregation (e.g., applying an aggregation operation to construct a data cube), dimensionality reduction (e.g., reducing the size of data via either lossy or lossless mechanisms), feature subset selection (e.g., selecting highly relevant features and discarding the rest), and/or any other data processing technique which may curate features for ingestion by a machine learning model.

At step 438, processor 312 may output the curated features generated by processing the ingestible features. In some embodiments, the outputted curated features may be fed to a following task. Additionally or alternatively, the outputted curated features may be stored in data store 316, provided to a user via a user interface in user device 320, and/or fed to machine learning model 360, as described in greater detail herein with respect to steps 440, 450, and 460, respectively.

By way of example, processor 312 may determine that a next object in pipeline 500 of FIG. 5 is task 510. Processor 312 may then retrieve the ingestible features specified in the request sent by user device 320 from raw feature databases 350, process the ingestible features based on the operations specified in the request, and output the curated features generated by processing the ingestible features. Processor 312 may then proceed to task 550, task 560, or both tasks 550 and 560 in parallel. For instance, in the case where processor 312 proceeds to task 550, processor 312 may retrieve the ingestible features specified in the request sent by user device 320, which may include outputted curated features from task 510 and optionally raw features from raw feature databases 350, process the ingestible features based on the operations specified in the request, and output the curated features generated by processing the ingestible features. The curated features generated by processor 312 through task 550 may be final curated features which may be fed to machine learning model 360. Additionally, one or more curated features generated by processor 312 through task 510 may also be final curated features which may be fed to machine learning model 360.

In some embodiments, processor 312 may retrieve ingestible features from two separate tasks, as depicted in the example of task 570, which includes features from tasks 520 and 530. Here, processor 312 may wait until processing curated features in both tasks 520 and 530 before completing task 570, as the outputs of both tasks 520 and 530 are needed to complete task 570. In addition, the ingestible features of 570 may also include raw features from raw feature databases 350.

In some embodiments, processor 312 may perform the operations of a task continually for a determined period of time. In these embodiments, processor 312 may begin performing the operations of another task which depends on the former task based on the continually generated output of the former task. For instance, processor 312 may be configured to perform the operations of task 510 continually for one month. In this case, processor 312 may begin performing the operations of task 550 based on the rolling output of task 510. Processor 312 may update task 550 with the output of task 510 in a time interval, for example, every 0.1 seconds, every 1 second, every 10 seconds, every 1 minute, every 1 hour, every 1 day, or any other appropriate time interval.

In some embodiments, a task may not depend on the output of any other task, such as tasks 510, 520, 530, and 540, and may be referred to as producer tasks. In other embodiments, a task may depend on the output of another task, such as tasks 550, 560, and 570, and may be referred to as consumer tasks. Consumer tasks may receive as input features from at least a previous task in the pipeline upon which they depend and optionally one or more other databases, such as raw feature databases 350.

At step 440, processor 312 may store curated features associated with at least one task in feature store 310. For example, processor 312 may store the curated features in data store 316. In some embodiments, processor 312 may store the curated features after completing a task or concurrently with processing the task. In other embodiments, processor 312 may store the curated features after a portion or all of the tasks in a pipeline are completed. By way of example, processor 312 may store the curated features of task 510 of FIG. 5 in data store 316 after completing task 510 or concurrently with processing task 510. For instance, task 510 may require processing during a predetermined amount of time. In this case, processor 312 may store the outputted curated features of task 510 continuously or in time intervals until task 510 is completed. In some embodiments, processor 312 may store all of the curated features outputted by each task in the pipeline. In other embodiments, processor 312 may store a portion of the curated features outputted by the tasks in the pipeline. The portion of the curated features may be determined by a user operating user device 320 or by feature store 310 via built-in rules or a machine learning model.

At step 450, processor 312 may render a user interface based on the request sent by user device 320. In some embodiments, the user interface may include a user-editable DAG and/or a metadata browser specifying data about the curated features stored in data store 316. The user interface may be rendered on user device 320. By way of example, the user-editable DAG may refer to the DAG of FIG. 5, depicting pipeline 500. In some embodiments, a user may edit a DAG by modifying code associated with the pipeline, as described in greater detail with respect to FIG. 7A. Additionally or alternatively, a user may edit a DAG through a web-based editor displaying the DAG, which may allow the user to generate or modify the pipeline by providing an appropriate input, such as dragging and dropping, clicking, typing, or the like. For instance, a user may drag one or more tasks from a task pane onto a canvas pane and edit properties of and links among the one or more tasks as required. Step 450 may be performed concurrently, before, or after any of the steps of method 400.

As another example, the metadata browser may refer to metadata browser 800 of FIG. 8, which depicts an example of a representation of data which may be contained in data store 316 of feature store 310. For instance, data store 316 may contain features relating to 5 pipelines for generating features, "winter_index_dev," "winter_index," "summer_index," "forecast_sale," and "sku_unitsold." Metadata browser 800 may specify data relating to each pipeline, for instance, its "Index," "Creator," "Description," and "Tags." Furthermore, each pipeline may be selected to provide more data about the selected pipeline. For instance, selected pipeline "forecast_sale" contains two outputted curated features, "forecast_daily_sale_result" and "forecast_weekly_sale_result." Metadata browser 800 further contains data about each of the curated features, for instance, their "Data Type," "Description," and an "Action" which may be taken on each curated feature, namely, "Update" of "Delete." Metadata browser 800 may also contain data regarding a "Creator," a "Created Time," and a "Last Access Time," associated with the curated features. In addition, metadata browser 800 may contain data regarding a "Minimum," a "Maximum," and an "Average" for numerical features, and a "Count" and a "Histogram" for distinct values for categoric features. Features from metadata browser 800 may also be downloaded by user device 320 or directly fed to machine learning model 360.

At step 460, processor 312 may provide curated features associated with one or more tasks to machine learning model

360 for ingestion. In some embodiments, the curated features may be provided to train machine learning model 360. In other embodiments, the curated features are provided to machine learning model 360 for data analysis and/or forecasting.

In some embodiments, machine learning models may be trained using training examples, for example in the cases described below. Some non-limiting examples of such machine learning models may include classification algorithms, data regressions algorithms, mathematical embedding algorithms, natural language processing algorithms, support vector machines, random forests, nearest neighbors algorithms, deep learning algorithms, artificial neural network algorithms, convolutional neural network algorithms, recursive neural network algorithms, linear machine learning models, non-linear machine learning models, ensemble algorithms, and so forth. In some examples, the training examples may include example inputs together with the desired outputs corresponding to the example inputs. Further, in some examples, training machine learning algorithms using the training examples may generate a trained machine learning model, and the trained machine learning model may be used to estimate outputs for inputs not included in the training examples. In some examples, engineers, scientists, processes, and machines that train machine learning models may further use validation examples and/or test examples. For example, validation examples and/or test examples may include example inputs together with the desired outputs corresponding to the example inputs, a trained machine learning model and/or an intermediately trained machine learning model may be used to estimate outputs for the example inputs of the validation examples and/or test examples, the estimated outputs may be compared to the corresponding desired outputs, and the trained machine learning model and/or the intermediately trained machine learning model may be evaluated based on a result of the comparison. In some examples, a machine learning model may have parameters and hyper parameters, where the hyper parameters are set manually by a person or automatically by a process external to the machine learning model (such as a hyper parameter search algorithm), and the parameters of the machine learning model are set by the machine learning model according to the training examples. In some implementations, the hyper-parameters are set according to the training examples and the validation examples, and the parameters are set according to the training examples and the selected hyper-parameters.

In some embodiments, trained machine learning models may be used to analyze inputs and generate outputs, for example in the cases described below. In some examples, a trained machine learning algorithm may be used as an inference model that when provided with an input generates an inferred output. For example, a trained machine learning algorithm may include a classification algorithm, the input may include a sample, and the inferred output may include a classification of the sample (such as an inferred label, an inferred tag, and so forth). In another example, a trained machine learning algorithm may include a regression model, the input may include a sample, and the inferred output may include an inferred value for the sample. In yet another example, a trained machine learning algorithm may include a clustering model, the input may include a sample, and the inferred output may include an assignment of the sample to at least one cluster. In some examples, the trained machine learning algorithm may include one or more formulas and/or one or more functions and/or one or more rules and/or one or more procedures, the input may be used as input to the formulas and/or functions and/or rules and/or procedures, and the inferred output may be based on the outputs of the formulas and/or functions and/or rules and/or procedures (for example, selecting one of the outputs of the formulas and/or functions and/or rules and/or procedures, using a statistical measure of the outputs of the formulas and/or functions and/or rules and/or procedures, and so forth).

Figure 6:
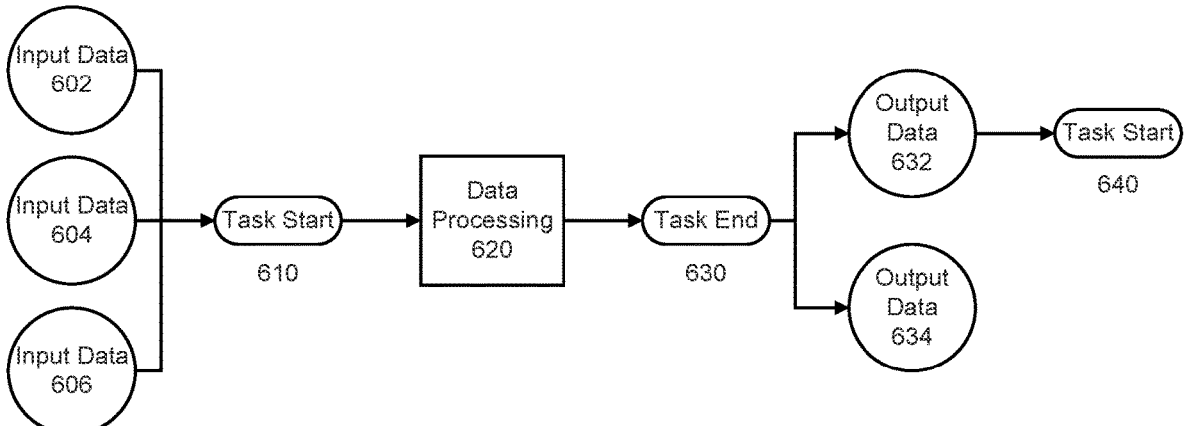
FIG. 6 is a block diagram of an exemplary task for processing data for use in a machine learning model, consistent with the disclosed embodiments.

As another example, an example of a task is depicted in FIG. 6. Here, task start 610 may correspond to the start of task 510 of FIG. 5. Task 510 receives as input three sets of input data, corresponding to input data 602, 604, and 606. Processor 312 may perform data processing 620 as discussed above with respect to step 436 of FIG. 4 until task 510 is completed at task end 630. Processor 312 may then output the processed data as output data 632 and 634, out of which output data 632 may be ingested by task 550 at task start 640.

FIGS. 7A, 7B, and 7C depict exemplary requests generation of a pipeline, a task, and a sensor, respectively. In some embodiments, the requests may be written in Python, Scala, Java, JavaScript MySQL, C, C++, C#, Ruby, YAML, or any other appropriate coding language. In other embodiments, the requests may be sent through user device 320 via a user interface without the need for coding, for example, by filling out a form. For example, FIG. 7A depicts an exemplary request 700 for a user operating user device 320 to request generation of a pipeline, including a "name" of the pipeline, a "kind" (e.g., referring to the type of object to be generated), "tasks" to be included in the pipeline, a "description" of the pipeline (matching the description shown in FIG. 8 for "forecast_sale"), an "owner" (matching the "Creator" shown in FIG. 8 for "forecast_sale"), and "email," and a "start_date." The depicted fields are merely exemplary and are non-limiting. For example, an additional "end_date" field may be included in request 700. In some embodiments, the tasks selected by the user by themselves may specify which curated features to output. In other embodiments, a user may specify which curated features to output.

FIG. 7B depicts an exemplary request 710 for a user operating user device 320 to request generation of a task, including a "name" of the task, an "owner" or the task, "inputs" corresponding to the ingestible features of the task, "outputs" corresponding to the curated features the task will generate, a "kind" (e.g., referring to the type of object to be generated), a "command" referring to one or more operations which the task will perform, and "sensors" which will be linked to the task and will prevent the task from being performed before a trigger is detected. The depicted fields are merely exemplary and are non-limiting. For example, a user may specify in request 710 a timeframe during which the task will be performed or may specify a type of task. For instance, examples of types of tasks may be "dag" for an Airflow DAG, "oozie" for an Oozie workflow, "ssh" for Remote SSH tasks, or the like.

FIG. 7C depicts an exemplary request 720 for a user operating user device 320 to request generation of a sensor, including a "name" of the sensor, a "type" of sensor (e.g., a flag sensor), a "kind" (e.g., referring to the type of object to be generated), and a "bucket key." A bucket key may refer to a location of a file containing code defining a sensor.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for processing data for use in machine learning models, the system comprising:
   a memory storing instructions; and
   one or more processors configured to execute operations comprising:
      receiving a request to generate a pipeline including two or more tasks and one or more sensors, the request defining for each of the two or more tasks which features to ingest, which features to output, and instructions for processing the features;
      generating the pipeline including the two or more tasks and the one or more sensors based on the request;
      for the one or more sensors:
         sending, at a first time via a network, a periodic request to an external system for a variable;
         receiving, via the network, the variable from the external system;
         determining, based on the received variable, whether the sensor is triggered;
         based on determining that the sensor is not triggered, determining, at a second time via the network, whether the sensor is triggered;
         in response to determining that the sensor is triggered, determining whether a next object in the generated pipeline is another sensor of the one or more sensors or a task of the two or more tasks; and performing operations of the next object, wherein operations of the next object after the sensor are only performed after the sensor is triggered;
      for one or more producer tasks of the two or more tasks:
         retrieving the ingestible features from one or more databases,
         processing the features based on the received instructions, and
         outputting curated features;
      for one or more consumer tasks of the two or more tasks:
         retrieving the ingestible features from a previous task in the pipeline upon which the consumer task depends,
         processing the features based on the received instructions, and
         outputting curated features;
      storing the curated features associated with one or more tasks of the two or more tasks in a feature store; and
      providing the stored curated features associated with the one or more tasks of the two or more tasks to a machine learning model for ingestion.

2. The system of claim 1, wherein the request includes information specifying at least one of where to locate the ingestible features for retrieval, a data quality expectation, sensors, an owner, or a timeframe.

3. The system of claim 1, wherein retrieving the ingestible features from a previous task in the pipeline further includes retrieving features from the one or more databases.

4. The system of claim 1, the operations further comprising rendering a user interface based on the request, the user interface including a user-editable Directed Acyclic Graph (DAG).

5. The system of claim 1, wherein providing the curated features includes rendering a user interface including a metadata browser specifying data about the stored curated features.

6. The system of claim 1, wherein processing the features includes at least one of aggregation, data quality improvement, data cleansing, data preprocessing, joining, filtering, encoding, normalizing, binning, hashing, computing polynomial features, and representation learning.

7. The system of claim 1, the request further defining which curated features associated with the one or more tasks of the two or more tasks to store in the feature store and to provide to the machine learning model.

8. The system of claim 1, wherein the two or more tasks retrieve the ingestible features at predetermined time intervals, at a predetermined time of day, or following a trigger.

9. The system of claim 1, wherein the ingestible features and the curated features include measurable properties of a data sample.

10. A computer-implemented method for processing data for use in machine learning models, the method comprising:
    receiving a request to generate a pipeline including two or more tasks and one or more sensors, the request defining for each of the two or more tasks which features to ingest, which features to output, and instructions for processing the features;
    generating the pipeline including the two or more tasks and the one or more sensors based on the request;
    for the one or more sensors:
       sending, at a first time via a network, a periodic request to an external system for a variable;
       receiving, via the network, the variable from the external system;

determining, based on the received variable, whether the sensor is triggered;

based on determining that the sensor is not triggered, determining, at a second time via the network, whether the sensor is triggered;

in response to determining that the sensor is triggered, determining whether a next object in the generated pipeline is another sensor of the one or more sensors or a task of the two or more tasks; and performing operations of the next object, wherein operations of the next object after the sensor are only performed after the sensor is triggered;

for one or more producer tasks of the two or more tasks:

retrieving the ingestible features from one or more databases, processing the features based on the received instructions, and outputting curated features;

for one or more consumer tasks of the two or more tasks:

retrieving the ingestible features from a previous task in the pipeline upon which the consumer task depends, processing the features based on the received instructions, and outputting curated features;

storing the curated features associated with one or more tasks of the two or more tasks in a feature store; and providing the stored curated features associated with the one or more tasks of the two or more tasks to a machine learning model for ingestion.

11. The system of claim 10, wherein the request includes information specifying at least one of where to locate the ingestible features for retrieval, a data quality expectation, sensors, an owner, or a timeframe.

12. The system of claim 10, wherein retrieving the ingestible features from a previous task in the pipeline further includes retrieving features from the one or more databases.

13. The system of claim 10, the operations further comprising rendering a user interface based on the request, the user interface including a user-editable Directed Acyclic Graph (DAG) and a metadata browser specifying information about the provided curated features.

14. The system of claim 10, wherein processing the features includes at least one of aggregation, data quality improvement, data cleansing, data preprocessing, joining, filtering, encoding, normalizing, binning, hashing, computing polynomial features, and representation learning.

15. The system of claim 10, the request further defining which curated features associated with the one or more tasks of the two or more tasks to store in the feature store and to provide to the machine learning model.

16. The system of claim 10, wherein the two or more tasks retrieve the ingestible features at predetermined time intervals, at a predetermined time of day, or following a trigger.

17. The system of claim 10, wherein the ingestible features and the curated features include measurable properties of a data sample.

18. A computer-implemented system for processing data for use in machine learning models, the system comprising:

a memory storing instructions; and one or more processors configured to execute operations comprising:

receiving a request to generate a pipeline including two or more tasks and one or more sensors, the request defining for each of the two or more tasks which features to ingest, which features to output, and instructions for processing the features;

generating the pipeline including the two or more tasks and one or more sensors based on the request;

for the one or more sensors:

sending, at a first time via a network, a periodic request to an external system for a variable;

receiving, via the network, the variable from the external system;

determining, based on the received variable, whether the sensor is triggered;

based on determining that the sensor is not triggered, determining, at a second time via the network, whether the sensor is triggered;

in response to determining that the sensor is triggered, determining whether a next object in the generated pipeline is another sensor of the one or more sensors or a task of the two or more tasks; and performing operations of the next object, wherein operations of the next object after the sensor are only performed after the sensor is triggered;

for one or more producer tasks of the two or more tasks, at predetermined time intervals:

retrieving the ingestible features from one or more databases, processing the features based on the received instructions, and outputting curated features;

for one or more consumer tasks of the two or more tasks, at predetermined time intervals:

retrieving the ingestible features from a previous task in the pipeline upon which the consumer task depends, processing the features based on the received instructions, and outputting curated features;

storing the curated features associated with one or more tasks of the two or more tasks in a feature store;

rendering a user interface based on the request, the user interface including a user-editable Directed Acyclic Graph (DAG) and a metadata browser specifying data about the stored curated features; and providing the stored curated features associated with the one or more tasks of the two or more tasks to a machine learning model for ingestion.

* * * * *